(12) United States Patent
Behrends et al.

(10) Patent No.: US 8,159,260 B1
(45) Date of Patent: Apr. 17, 2012

(54) DELAY CHAIN BURN-IN FOR INCREASED REPEATABILITY OF PHYSICALLY UNCLONABLE FUNCTIONS

(75) Inventors: Derick Gardner Behrends, Rochester, MN (US); Todd Alan Christensen, Rochester, MN (US); Travis Reynold Hebig, Rochester, MN (US); Daniel Mark Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/898,044

(22) Filed: Oct. 5, 2010

(51) Int. Cl.
*H03K 19/00* (2006.01)
*G06F 11/30* (2006.01)
*G06F 13/00* (2006.01)

(52) U.S. Cl. ............ 326/8; 713/193; 713/194; 711/163; 711/164

(58) Field of Classification Search ............... 326/8, 104, 326/113, 93–95
See application file for complete search history.

(56) References Cited

U.S. PATENT DOCUMENTS

| | | | |
|---|---|---|---|
| 7,053,651 B2 * | 5/2006 | Gonzalez | 326/38 |
| 2002/0140460 A1 * | 10/2002 | Kawakami et al. | 326/121 |
| 2009/0116322 A1 * | 5/2009 | Han et al. | 365/201 |

* cited by examiner

*Primary Examiner* — Shawki S Ismail
*Assistant Examiner* — Thienvu Tran
(74) *Attorney, Agent, or Firm* — Martin & Associates LLC; Bret J. Petersen

(57) ABSTRACT

A circuit and method increases the repeatability of physically undetectable functions (PUFs) by enhancing the variation of signal delay through two delay chains during chip burn-in. A burn-in circuit holds the inputs of the two delay chains at opposite random values during the burn-in process. All the PFETs in the delay chains with a low value at the input will be burned in with a higher turn on voltage. Since the PFETs affected in the two delay chains are driven by opposite transitions at burn-in, alternating sets of delay components in the two delay chains are affected by the burn-in cycle. Under normal operation, both of the delay chains see the same input so only one chain has an increase in delay to achieve a statistically reliable difference in the two delay paths thereby increasing the overall repeatability of the PUF circuit.

13 Claims, 4 Drawing Sheets

DELAY CHAIN BURN-IN FOR INCREASED REPEATABILITY OF PHYSICALLY UNCLONABLE FUNCTIONS

BACKGROUND

1. Technical Field

This disclosure generally relates to physically unclonable functions, and more specifically relates to burn-in of delay chains for increased repeatability of physically unclonable functions.

2. Background Art

For security reasons, it is desirable to implement physically unclonable functions (PUF) in integrated circuits. A PUF is an electrical circuit function that is difficult to characterize and clone. A PUF is useful for challenge-response authentication type security in electronic systems. The PUF can be used in electronic systems to obtain different functions or security keys in two chips where the differences in the two chips are physically undetectable. Each PUF device has a unique and unpredictable way of mapping challenges to responses.

A silicon or physical PUF exploits random variations in a circuit produced during the manufacturing of the circuit device. The PUF circuit can use these random variations in the delay of circuit components to achieve an unpredictable mapping of challenges and responses. For example, given an input challenge, a race condition is set up in the circuit, and two transitions that propagate along different paths are compared to see which comes first. An arbiter, typically implemented as a latch, produces a logical "1" or a "0", depending on which transition comes first. When a circuit with the same layout mask is fabricated on different chips, the logic function implemented by the circuit is different for each chip due to the random variations of delays. To achieve repeatability, the random delay needs to be greater than the sensitivity of the arbiter. If the random process variation does not cause a statistically reliable difference in the delay of the paths, then the PUF will have low repeatability. This means that variation in temperature, voltage, and other factors can change the response of the system and thus the challenge response of the circuit will not be useful due to low repeatability.

BRIEF SUMMARY

The disclosure is directed to a circuit and method for increasing the repeatability of physically undetectable functions (PUFs) by enhancing the variation of signal delay through two delay chains during chip burn-in. A burn-in circuit is used to hold the inputs of the two delay chains at opposite random values during the burn-in process such that one delay chain is held at one random state and the other delay chain is held at the opposite random state. All the PFETs in the delay chains with a low value at the input will be burned in with a higher turn on voltage due to the known phenomenon of Negative Biased Temperature Instability (NBTI). Since the PFETs affected in the two delay chains are driven by opposite transitions at burn-in, alternating sets of delay components in the two delay chains are affected by the burn-in cycle. Under normal operation, both of the delay chains see the same input so only one chain has an increase in delay to achieve a statistically reliable difference in the two delay paths thereby increasing the overall repeatability of the PUF circuit.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a circuit for increased repeatability of a physically undetectable function (PUF) by increasing the delay difference of delay components at burn-in;

FIG. 4 illustrates is a schematic diagram of the delay circuits shown in FIG. 1 during burn-in;

FIG. 6 is a method flow diagram for increasing the repeatability of PUFs by enhancing the variation of signal delay through two inverter chains during chip burn-in.

DETAILED DESCRIPTION

Described herein is an apparatus and method for increasing the repeatability of physically undetectable functions (PUFs) by enhancing the variation of signal delay through two delay chains during chip burn-in. A burn-in circuit is used to hold the inputs of the two delay chains at opposite random values during the burn-in process such that one delay chain is held at one random state and the other delay chain is held at the opposite random state. All the PFETs in the delay chains with a low value at the input will be burned in with a higher turn on voltage due to the known phenomenon of Negative Biased Temperature Instability (NBTI). Since the PFETs affected in the two delay chains are driven by opposite transitions at burn-in, alternating sets of delay components in the two delay chains are affected by the burn-in cycle. Under normal operation, both of the delay chains see the same input so only one chain has an increase in delay to achieve a statistically reliable difference in the two delay paths thereby increasing the overall repeatability of the PUF circuit.

Figure 1:
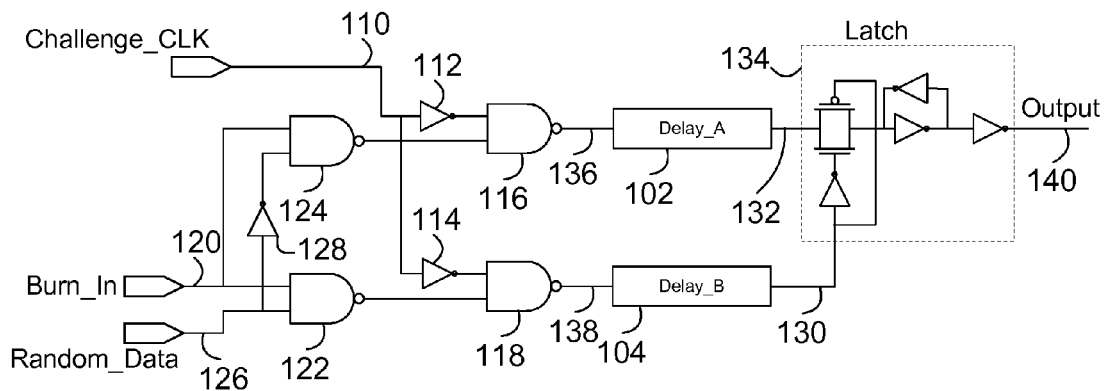

As described in the background, a PUF circuit can use random variations in the delay of circuit components to achieve an unpredictable mapping of challenges and responses. However, where the random process variation does not cause a statistically reliable difference in the delay of the paths, then the PUF will have low repeatability. FIG. 1 illustrates a circuit for increased repeatability of a PUF by increasing the delay difference of delay chains 102, 104. A favored state is burned into delay chains in the delay chain circuits Delay_A 102 and Delay_B 104 during a burn in process as described below. The circuit shown in FIG. 1 has a burn-in mode that holds the inputs of the delay chain components in a random but steady state during the burn-in process. After burn-in, the circuit operates in a challenge/response mode as described further below. In a challenge-response authentication application, raising the "Challenge_CLK" to a high logic level is the challenge and the resulting data output on the latch is the response.

Referring again to FIG. 1, the burn-in mode the circuit will now be described. In this mode, Challenge_Clk 110 is held at a low logic state such that the inverters 112, 114 apply a high signal to NAND gates 116, 118; and the Burn_In input 120 connected to NAND gates 122, 124 is held at a high logic state. A random number generator (not shown) is used to generate Random_Data 126. The random number generator used to provide Random_Data 126 can be any known random number generator having output data that is sufficiently random. Random_Data 126 is thus an input signal that is randomly a logic "1" (high) or a logic "0" (low). These inputs are held for the duration of the burn-in process. Random_Data 126 is applied to NAND gate 122 and inverter 128 supplies an inverted Randon_Data signal to NAND gate 124. With Burn_In 120 held high, and Challenge_CLK 110 held low, opposite data from Random_Data 126 is applied to the inputs of Delay_A 102 and Delay_B 104. The circuit is held in this state while the elements Delay_A 102 and Delay_B 104 are burned-in. This can be done through typical burn-in methods. A typical burn-in method includes raising the voltages by about 80% and raising the temperature of the whole chip to about 100 degrees Celsius while exercising the chip. Alternatively, only the Delay_A 102 and Delay_B 104 delay chain components can be burned-in (for example, by connecting them to a separate voltage domain and only elevating the voltage of that separate voltage domain). After burn-in, the delay chains will perform differently as described further below. One will be faster for a rising edge transition through it and the other will be faster for a falling edge transition through it. If the delay chains are made up of a sufficient number of components, this delay difference is statistically very reliable.

The challenge/response mode of the circuit shown in FIG. 1 will now be described. The circuit is placed in this mode when the inputs are as follows: Challenge_Clk 110 is low, Burn_In 120 is low and Random_Data 126 is "don't care", meaning either a high or a low. When the input Challenge_CLK 110 transitions from low to high, it causes the inputs 136, 138 of elements Delay_A 102 and Delay_B 104 to transition from low to high simultaneously. Since the Delay_A 102 and Delay_B 104 elements have already been burned-in, one of them will be faster than the other for this rising edge transition through them. If Delay_A 102 is faster, a "1" will be stored in the latch 134. If Delay_B 104 is faster, the transmission gate (described below) in the latch 134 will become opaque before the "1" gets to it through Delay_A 102. This will cause the original "0" to be stored in the latch. The state of the latch is available on the output line 140.

The modes of operation are summarized in Table 1 with the inputs on Challenge_Clk, Burn_In and Random_Data as shown.

TABLE 1

Modes of operation

| Challenge_Clk | Burn_In | Random_Data | Mode |
|---|---|---|---|
| 0 | 0 | X | Idle |
| 0 | 1 | 0 | Burn_In |
| 0 | 1 | 1 | Burn_In |
| 0->1 | 0 | X | Challenge/Response |
| 1 | 1 | X | Invalid |

Figure 2:
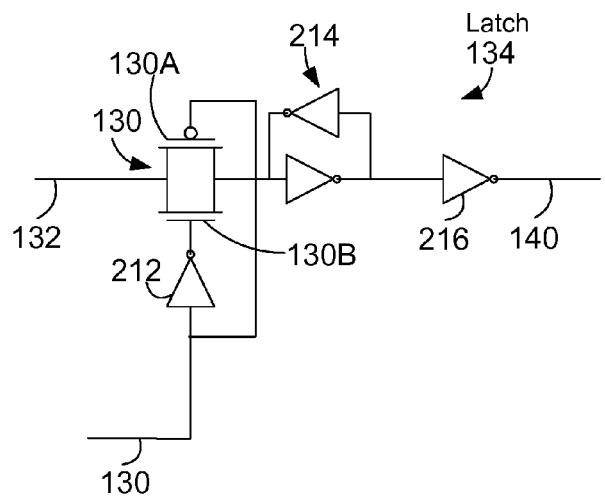
FIG. 2 is a schematic diagram for a latch that can be used in the circuit of FIG. 1.

FIG. 2 represents a schematic diagram for a logic component called a latch. The latch 134 shown in FIG. 2 is a possible implementation of the latch described in the circuit of FIG. 1. The purpose of the latch is to output a "0" or a "1" depending on which delay circuit 102, 104 is faster at propagating a signal after seeing a simultaneous rising edge at the inputs 136, 138. If Delay_B 104 is faster, the transmission gate 210 in the latch 134 will be turned off by the rising edge of Delay_B output 130 applied to the PFET 130A of the latch 130 and the inverted Delay_B output 130 provided by the inverter 212 applied to the NFET 130B of the latch 130. With the latch turned off before a "1" can get through from Delay_A, the original "0" will be stored in the latch. If however Delay_A 102 is faster, a "1" will be stored in the latch 134. If this case, the transmission gate 210 will still be turned on and the "1" from the output 132 of Delay_A will be applied to the inverter pair 214. The inverter pair 214 will hold the "1" state of the latch this state will be reflected at output 140 after inverter 216. Of course those skilled in the art understand other similar latches could be used in the circuit shown in FIG. 1.

Figure 3:
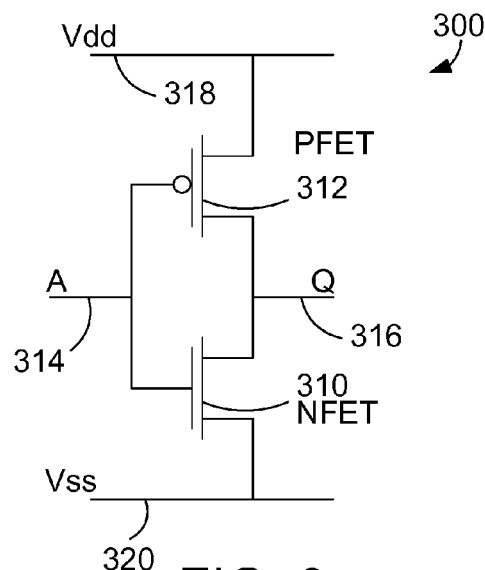
FIG. 3 illustrates a schematic diagram for a complementary metal-oxide semiconductor (CMOS) inverter.

FIG. 3 illustrates a schematic diagram for a complementary metal-oxide semiconductor (CMOS) inverter 300. As discussed above, delay circuits Delay_A 102 and Delay_B 104 in FIG. 1 are preferably a delay chains comprising a sequence of several components that include a PFET. In the most preferred implementation, the delay chains described above are made using a chain of CMOS inverters as shown in FIG. 3. Other logic components could be used such as NAND gates, NOR gates, etc. Also, components with a series of components known as stacked capacitors could be used. CMOS integrated circuits use complementary pairs of a p-type and an n-type transistors.

A CMOS inverter is made of two devices, an n-type field effect transistor (NFET) 310 and a p-type field effect transistor (PFET) 312. It is called an inverter simply because the output state is the inversion of the input state. When inverter input A 314 is a "0" the PFET 312 will turn on and pull the output Q 316 to a "1" (Vdd 318), while the NFET 310 is shut off by the "0" input. Switching the input A 314 from a "0" to "1" does the exact opposite; the NFET 310 turns on and pulls output Q 316 to "0" (Vss 320) while PFET 312 is shut off.

Negative biased temperature instability (NBTI) is a reliability concern with p-type CMOS devices. It manifests itself as an increase in the threshold voltage required to turn on a PFET device. The degradation of NBTI devices decreases exponentially over time. Manufactured integrated circuits often undergo a burn-in procedure that stresses the part to screen out the initial degradation of the parts. A PFET that has a static state of "0" on it's input during chip burn-in is stressed due to NBTI which causes it's turn on voltage (Vt) to be permanently elevated. PFETs with elevated Vt are slower to turn on. The circuit described above utilizes the phenomenon of NBTI and the burn-in procedure to enhance the variation of signal delay through two delay chains to increase the repeatability of the PUF circuit.

Figure 4:
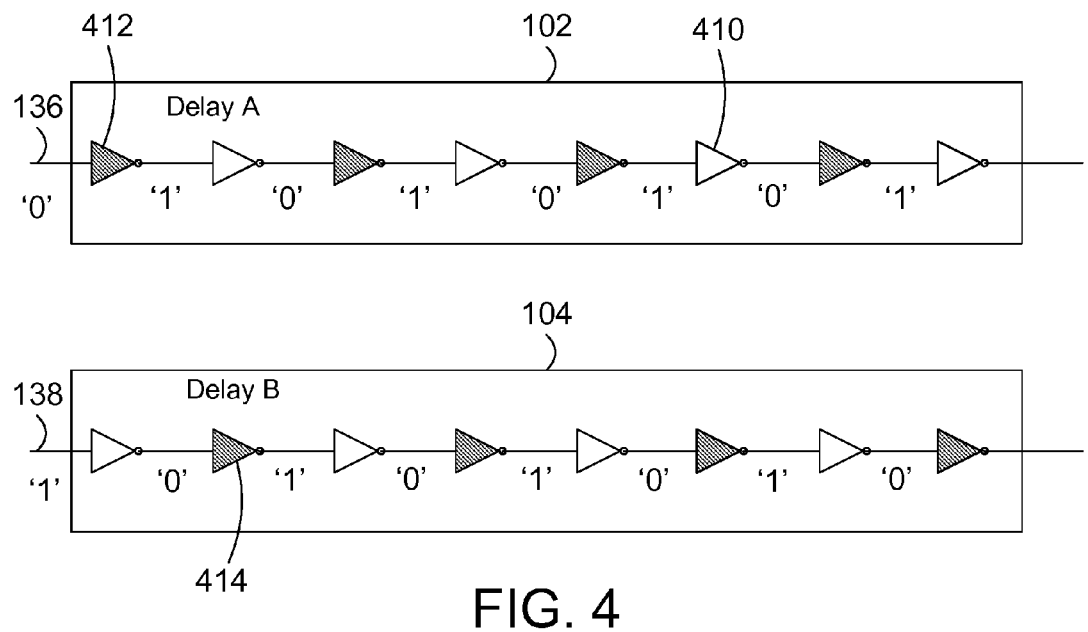

FIG. 4 illustrates a schematic diagram of the delay circuits Delay_A 102 and Delay_B 104 during the burn-in process. The delay circuits Delay_A 102 and Delay_B 104 preferably have a delay chain comprising an equal number of inverters 410 as shown. The number of inverters 410 used depends on the sensitivity of the arbiter and the delay difference of the delay chain. In this example, the delay circuit Delay_A 102 has in input 136 with a "0". Thus the odd inverters 412 (shaded in black) will see a "0" input during the burn-in and with thus be subject to NBTI degradation as described above. After burn-in this delay chain would pass a transition of "1" to "0" much slower. In contrast the delay circuit Delay_B 104 has in input 138 with a "1". The even inverters 414 of Delay_B 104 (shaded in black) will see a "0" input during the burn-in and will thus be subject to NBTI degradation. Thus the Delay_B 104 will have the opposite burn-in degradation causing the transition of "0" to "1" to be much slower. Thus the two delay chains will be skewed opposite of each other making one transition delay slower and the other faster improving repeatability of the PUF. The data burned into the inverter chains is physically unclonable because it was generated randomly. Furthermore, the data is different for each chip manufactured with the same mask set and same process.

Thus, the favored state of the inverter chains is physically undetectable. This makes an integrated circuit with the PUF resilient to hacking through physical inspection and teardown of the chip. Strong encryption can be implemented by using many copies of the circuit described above for multiple bits of data.

Figure 5:
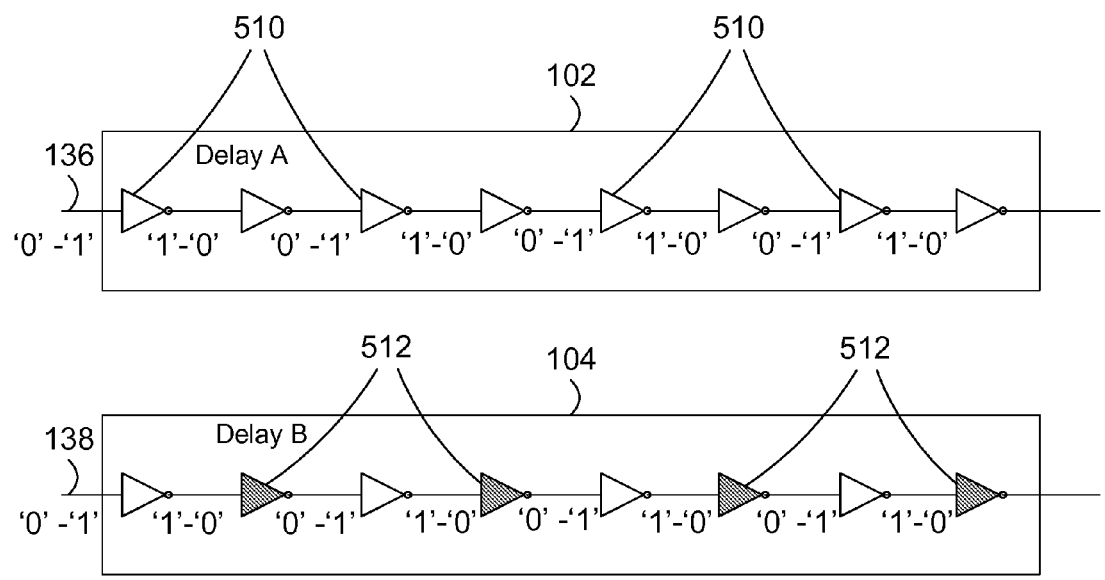
FIG. 5 illustrates is a schematic diagram of the delay circuits shown in FIG. 1 during operation.

FIG. 5 illustrates a schematic diagram of the delay chains Delay_A 102 and Delay_B 104 during normal operation of the circuit after burn-in. FIG. 5 illustrates the delay chains under normal operation, meaning they are operating in the challenge/response mode as described above. In this mode, both of the delay chains 102, 104 see the same logic level at their inputs 136, 138. In this example, each of the delay chains 102, 104 start with a low logic level or "0" and transition high at the inputs 136, 138 when challenge clock transitions low to high. Delay_B 104 will have additional delay on the elements 512 burned-in as described above and shown shaded in black because these element reflect additional delay for low to high transitions. In contrast, the delay elements 510 that were burned in Delay_A 102 will not add additional delay since they are seeing a low to high logic level transition. Thus only chain Delay_B will have an increase in delay. This added delay will provide a statistically reliable difference in the two delay paths thereby increasing the overall repeatability of the PUF circuit.

Figure 6:
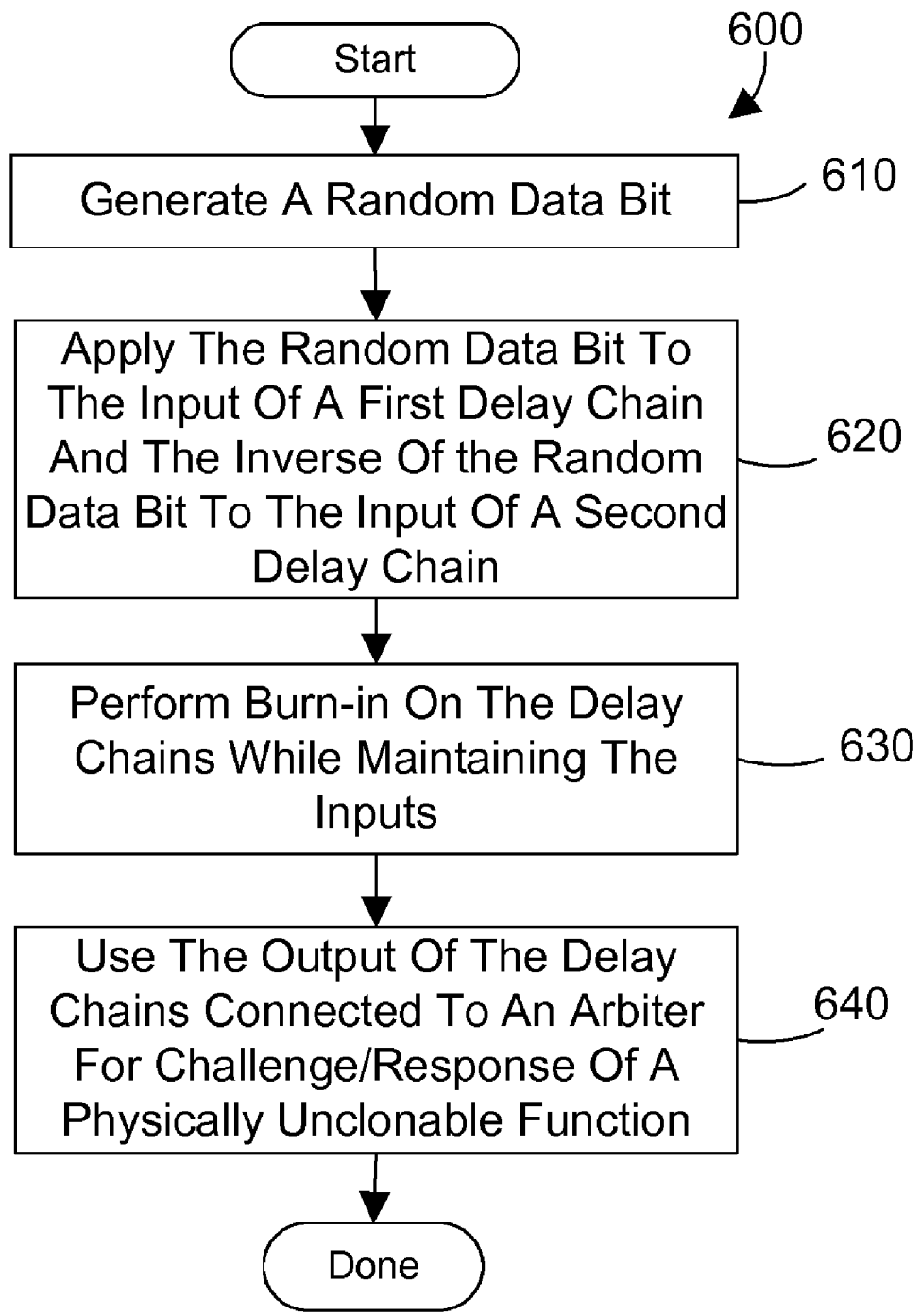

FIG. 6 shows a method 600 for increasing the repeatability of physically undetectable functions (PUFs) by enhancing the variation of signal delay through two inverter chains during chip burn-in as claimed herein. First, generate a random data bit (step 610). Next, apply the random data bit to the input of a first delay chain and an inverse of the random data bit to a second delay chain (step 620). Then, perform a burn-in on the delay chains while maintaining the inputs in step 620 (step 630). The burn-in may be for just the delay chain circuits, or for the entire chip containing the delay chains. Then use the output of the delay chains connected to an arbiter for a challenge/response in a physically unclonable function (step 640). The method is then done.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. An electronic circuit comprising:
   a first delay chain and a second delay chain each having inputs and outputs;
   a burn-in circuit that places the electronic circuit in a burn-in mode and places a random input bit on the input of the first delay chain and places an inverse of the random input bit on the input of the second delay chain and holds these inputs of the first and second delay chains while the circuit is burned in; and
   an arbiter circuit connected to the outputs of the first and second delay chains to output a "0" or a "1" depending on which delay chain is faster when a challenge bit is applied at the inputs of first and second delay chains.

2. The electronic circuit of claim 1 wherein the outputs of the delay chains connected to the arbiter provide for a challenge/response of physically unclonable function.

3. The electronic circuit of claim 1 wherein the arbiter circuit is a latch that detects which of the first and second delay chains transitions first after receiving a challenge input.

4. The electronic circuit of claim 1 wherein the circuit burn-in includes burning-in an entire integrated circuit containing the first and second delay chains.

5. The electronic circuit of claim 1 wherein the first and second delay chains are a chain of complementary metal-oxide semiconductor (CMOS) inverters.

6. The electronic circuit of claim 1 wherein the first and second delay chains are a chain of complementary metal-oxide semiconductor (CMOS) NAND gates.

7. The electronic circuit of claim 1 wherein the burn-in circuit comprises:
   a first and second NAND gate, with the first NAND gate having an output connected to the first delay chain, the second NAND gate having an output connected to the second delay chain, and a challenge_clk signal connected to a first input of the first and second NAND gates, wherein the output of the first and second NAND gates provide the random bit and the inverse of the random bit on the inputs of the delay chains;
   a third and fourth NAND gate, with the third NAND gate having an output connected to a second input of the first NAND gate and the fourth NAND gate having an output connected to a second input of the second NAND gate;
   a burn-in signal connected to a first input of the third and fourth NAND gates; and
   a random data signal connected to a second input of the fourth NAND gate and connected to a second input of the third NAND gate through an inverter.

8. An electronic circuit comprising:
   a first delay chain and a second delay chain each having inputs and outputs, wherein the first and second delay chains are a chain of complementary metal-oxide semiconductor (CMOS) inverters;
   a burn-in circuit that places the electronic circuit in a burn-in mode and places a random input bit on the input of the first delay chain and places an inverse of the random input bit on the input of the second delay chain and holds these inputs of the first and second delay chains while the circuit is burned in;
   a latch connected to the outputs of the first and second delay chains to output a "0" or a "1" depending on which delay chain is faster when a challenge bit is applied at the inputs of first and second delay chains, wherein the outputs of the delay chains connected to the arbiter provide for a challenge/response of physically unclonable function;
   wherein the burn-in circuit comprises:
   a first and second NAND gate, with the first NAND gate having an output connected to the first delay chain, the second NAND gate having an output connected to the second delay chain, and a challenge_clk signal connected to a first input of the first and second NAND gates, wherein the output of the first and second NAND gates provide the random bit and the inverse of the random bit on the inputs of the delay chains;
   a third and fourth NAND gate, with the third NAND gate having an output connected to a second input of the first NAND gate and the fourth NAND gate having an output connected to a second input of the second NAND gate;
   a burn-in signal connected to a first input of the third and fourth NAND gates; and
   a random data signal connected to a second input of the fourth NAND gate and connected to a second input of the third NAND gate through an inverter.

9. A method for increased repeatability in physically unclonable functions by increasing the delay difference of delay chains in an integrated circuit, the method comprising the steps of:
  (A) generating a random bit;
  (B) applying the random bit to an input of a first delay chain and an inverse of the random bit to an input of a second delay chain;
  (C) performing burn-in on the first and second delay chains while maintaining the random bit and the inverse of the random bit at the inputs to the first and second delay chains; and
  (D) using outputs of the delay chains connected to an arbiter for a challenge/response of physically unclonable function.

10. The method of claim 9 wherein the arbiter is a latch that detects which of the first and second delay chains transitions first after receiving a challenge input.

11. The method of claim 9 wherein the step of performing burn-in includes burning-in an entire integrated circuit containing the first and second delay chains.

12. The method of claim 9 wherein the first and second delay chains are a chain of complementary metal-oxide semiconductor (CMOS) inverters.

13. The method of claim 9 wherein the first and second delay chains are a chain of complementary metal-oxide semiconductor (CMOS) NAND gates.

* * * * *